EXCLUSIVE-OR CIRCUIT UTILIZING CONSTANT CURRENT
TO THE EMITTERS OF MULTIPLE TRANSISTORS

Filed Dec. 31, 1962

INVENTOR.
RAYMOND W. CLARKE
DAVID KENNINGHAM
BY
Frank R. Trifari
AGENT 3,201,609

EXCLUSIVE-OR CIRCUIT UTILIZING CONSTANT CURRENT TO THE EMITTERS OF MULTIPLE TRANSISTORS

Raymond William Clarke, Smallfield, Horley, and David Kenningham, Waimate, Marlborough, England, assignors to North American Philips Company, Inc., New York, N.Y., a corporation of Delaware Filed Dec. 31, 1962, Ser. No. 248,588
Claims priority, application Great Britain, Jan. 5, 1962, 534/62
6 Claims. (Cl. 307—88.5)

This invention relates to electrical logical circuits and more especially to circuits of the exclusive-OR type.

The circuits to which the invention relates are suitable for modes of operation in which both the inputs and the outputs are essentially voltage signals.

The invention provides a logical circuit comprising a pair of transistors having a coupling between their emitters, a pair of signal input terminals each of which is connected to one of the base electrodes of the transistor pair, means for supplying constant current to both emitters of the transistor pair, a collector load for each transistor of the pair, a logic output terminal, a pair of asymmetrically conductive paths each connecting one collector of the pair to said output terminal, and means for supplying to said output terminal a constant current in a direction corresponding to the forward direction of conduction of said asymmetrically conductive paths.

The supplies required for the constant currents are so-called "constant current" sources in the sense used herein that their internal impedances are large compared with the relevant impedances of the logical circuit. In the simplest case each of these sources may be no more than a resistance connected to one of the D.C. supply lines of the logical circuit, the supply voltages being given appropriately high values.

Preferably each asymmetrically conductive path is constituted by a semiconductor diode.

The principle of operation is as follows.

The circuit performs the exclusive-OR function. The inputs are applied to the bases of the two transistors, which form an emitter-coupled pair. A "0" input may for example be represented by zero volts and a "1" input by a positive voltage. The output is at the same potential when both inputs are "1's" and when both inputs are "0's," the emitter current dividing in the first case preferably equally between the two transistors. However, when either input is a "1" all the current flows through one transistor and one of the collectors becomes more positive (in the case of a p-n-p transistor) taking the output terminal with it.

A small amount of resistance can be inserted in the emitter-to-emitter coupling to facilitate equal current division between the two transistors as will be described. Alternatively, this may be achieved in a preferred manner wherein the emitter-to-emitter coupling is constituted by a pair of asymmetrically conductive paths connected to each other in parallel opposition, and wherein the means for supplying constant emitter current comprise means for supplying current independently to each emitter.

Specific embodiment of the invention will now be described by way of example with reference to the accompanying schematic drawings as applied to p-n-p junction transistors. In the drawings.

Figure 1:
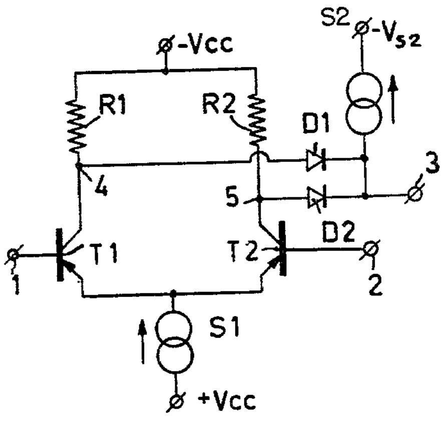
FIGURE 1 shows an exclusive-OR circuit.
Figure 2:
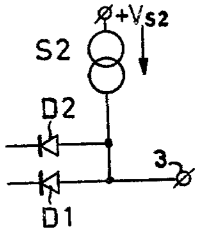
FIGURE 2 shows modifications of the output circuit of FIGURE 1.

Referring to FIGURE 1, the exclusive-OR circuit comprises a pair of transistors T1 and T2 having a coupling between their emitters, a pair of signal input terminals 1 and 2 each of which is connected to one of the base electrodes of the transistor pair, means S1 for supplying constant current to both emitters of the transistor pair, and a collector load R1 or R2 for each transistor of the pair. The circuit also has a logic output terminal 3, a pair of asymmetrically conductive paths (diodes D1 and D2) each connecting one collector of the transistor pair to said output terminal 3, and means S2 for supplying to said output terminal a constant current in a direction corresponding to the forward direction of conduction of the diodes D1 and D2. In each of the following examples the forward direction of D1 and D2 can be reversed provided S2 is also reversed (as shown in FIG. 2); this does not change the logic function of the circuit, but the ouput becomes negative since, if point 4 or point 5 goes positive, the other point must go negative.

Figure 3:
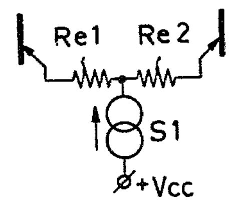
FIGURES 3 and 4 show variants of the emitter circuit of FIGURE 1.
Figure 4:
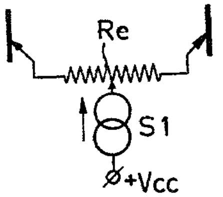

The operation of the circuit will be described in detail with reference to FIGURE 5 which is a preferred embodiment. Meanwhile it should be observed that, due to the spread in the *Vbe/Ie* characteristic of the transistors T1 and T2, the S1 current may not divide equally when 1 and 2 are at the same potential. Insertion of small resistors (R*e*1 and R*e*2 in FIGURE 3) can improve the equality of current division. Alternatively a small potentiometer R*e* can be used to accomplish this (FIGURE 4). In either event it is sufficient for the resistance in each half of the circuit to set up a voltage drop of about 0.5 v.

The use of emitter resistors requires larger inputs to operate the circuit. FIGURE 5 shows an alternative arrangement which overcomes the current sharing problem by having a separate emitter current source for each transistor.

Figure 5:
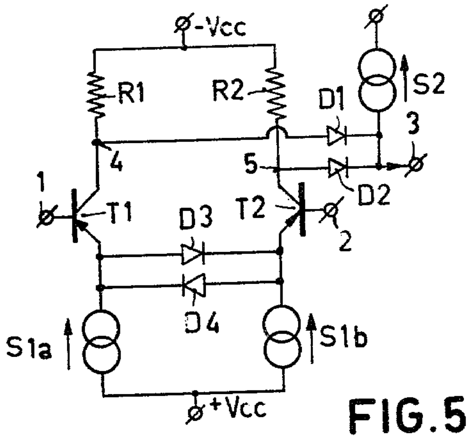
FIGURE 5 shows a further exclusive-OR circuit.

In the circuit of FIGURE 5 the emitter-to-emitter coupling is constituted by a pair of asymmetrically conductive paths (diodes D3 and D4) connected to each other in parallel opposition, and the means for supplying constant emitter current comprise means S1*a* and S1*b* for supplying current independently to each emitter.

Broadly, the operation is such that, when 1 and 2 are both at the same potential, each transistor passes a current. If, however, one input differs in potential from the other by more than a certain amount, the current from both sources S1*a* and S1*b* flows into one transistor. This takes either point 4 or point 5 positive thus driving point 3 in the positive direction.

For the detailed operation described below the following simplifying assumptions have been made:

(i) For a diode D1/D2 or D3/D4 to be conducting it must have a forward potential of +0.4 volt and this will be independent of the current passed.

(ii) A transistor will conduct when the base-emitter potential is −0.3 v. and this will be independent of the current passed.

(iii) A transistor will be cut off when the base-emitter potential is zero or positive (i.e., base positive with reference to emitter).

(iv) The currents from S1*a* and S1*b* are 10 ma. each, while the current taken by S2 is 4 ma. This leaves 16 ma. to be shaped betwen loads R1 and R2, and the latter are 150Ω each and are taken to a supply line which is at a potential −Vcc equal to −6 v.

(v) The $\alpha$ value of the transistors is substantially unity so that their collector currents are substantially equal to their emitter currents.

With these assumptions, the operation will be described for the various input conditions.

1. BOTH INPUTS "0"

The level of zero volts is chosen for a logical "0" though other levels could be used. The two transistors carry equal currents of 10 ma. each though strict equality is not essential provided that any circuit or device that may be driven by the exclusive —OR output is capable of accepting two differing values of output (corresponding respectively to input 1="1," input 2="0," and input 1="0," input 2="1") and distinguishing both values from that of the no-output condition. Diodes D3 and D4 are both off. The emitters are at +0.3 v. (see for instance (ii) above). Of the 20 ma. of emitter current, 4 ma. is taken by S2 so that R1 and R2 carry 8 ma. each. This in turn sets points 4 and 5 at —4.8 v. in view of the —Vcc supply of —6 v. Thus D1 and D2 both conduct (each carries 2 ma.) with a voltage drop of 0.4 v. (see for instance (i) above) so that the output terminal 3 is at —5.2 v.

2. ONE INPUT IS A "1," THE OTHER A "0"

It will be assumed that input 1 is "1" (operation is the same for input 2="1" since the circuit is symmetrical). The level for a "1" input is chosen at +0.7 v. since this is the minimum value for a signal to divert all the current into transistor T2. This voltage is made up of the —0.3 v. across the base-emitter junction of T2 and the —0.4 drop across the diode D3 carrying emitter current to T2. Transistor T1 and diode D1 and D4 are off, the current from S1*a* being fed to T2 via D3 (D3 is on because the emitters of T1 and T2 are at +0.7 v. and +0.3 v. respectively). The whole current (16 ma.) available for the collectors flows through R2 and this sets point S at —3.6 v.; the drop of 0.4 v. across D2 then sets the output (at 0) at —4.0 v.

3. BOTH INPUTS "1"

The output is the same as for two "0" inputs (although the emitters will be at a different voltage level).

Clearly, a negative input of —0.7 v. on point 1 would divert all the current from T2 to T1 thus taking point 3 positive and having the same effect on the output voltage as an input of +0.7 on B.

Although this would not change the operation of the exclusive-OR circuit, it is possible to treat its output as an "equivalence" output, i.e., an output obtained when both inputs are equal. In the present example, the circuit or device driven by the exclusive-OR circuit would be designed to treat as an output the negative-going change from —4 v. to —5.2 v. instead of the positive-going change from —5.2 v. to —4 v.

The circuits described can operate with pulse inputs or D.C. inputs.

The sources S1, S2, S1*a*, S1*b* have been shown schematically as constant current sources. In practice any one or each of the means for supplying constant current may comprise simply a resistance connected to a D.C. supply terminal and having a value which is large compared with the other impedances of the circuit; in operation each terminal must, of course, have applied to it a sufficiently high supply voltage and, in the case of the circuit of FIGURE 5, the values may be as given below in the table.

The following table provides, by way of illustration, one set of values and components suitable for the circuit of FIG. 5 and adapted to set up substantially the voltage and current conditions given in the description of the operation.

*Table*

Transistors T1 and T2—Mullard germanium type ASZ21.
Diodes D1, D2, D3 and D4—Mullard germanium type AAZ13.
Resistances for S1*a* and S1*b*—3.6K each.
Resistance for S2—8K.
+Vcc—+36 volts.
—Vcc—6 volts.

R1, R2—150Ω each.
—Vs2——36 volts.

The same values and components may be used for the circuit of FIGURE 1 except that the two 10 ma. currents of S1*a*–S1*b* are replaced by a single current of 20 ma. from S1 (S1 can be a 1.8K resistor fed from a +36 v. supply).

A further modification of the circuits illustrated can be obtained by replacing the diodes D3 and D4 of FIGURE 5 by a resistor.

It is desirable that the transistors should be prevented from bottoming and this is ensured, in the previous examples, by choosing the value of R1 and R2 (150Ω) so that bottoming does not occur when all the current (16 ma.) flows through one transistor.

While the invention has been described with respect to specific embodiments, it is to be understood that various changes and modifications thereof will readily occur to those skilled in the art without departing from the inventive concept, the scope of which is set forth in the appended claims. It is also to be understood that the quantitative values given are provided for illustrative purposes only, in order to enable ready practice of the invention.

What is claimed is:

1. A logical circuit comprising: a pair of transistors each having base, emitter and collector electrodes, means for coupling said emitter electrodes, a pair of signal input terminals each connected to one of said base electrodes, means for supplying a constant current to both emitter electrodes, a logic output terminal, a pair of asymmetrically conductive paths each connecting one collector electrode to said output terminal, and means for supplying to said output terminal a constant current in a direction corresponding to the forward direction of conduction of said asymmetrically conductive paths.

2. A logical circuit as set forth in claim 1, wherein said asymmetrically conductive paths are constituted by semiconductor diodes.

3. A logical circuit comprising: a pair of transistors each having base, emitter and collector electrodes, resistive means coupling said emitter electrodes together, a pair of signal input terminals each connected to one of said base electrodes, means for supplying a constant current to both emitter electrodes, a logic output terminal, a pair of asymmetrically conductive paths each connecting one collector electrode to said output terminal, and means for supplying to said output terminal a constant current in a direction corresponding to the forward direction of conduction of said asymmetrically conductive paths.

4. A logical circuit comprising: a pair of transistors each having base, emitter and collector electrodes, first and second asymmetrically conductive paths connected between said emitter electrodes, said paths being conductive in opposite directions, a pair of signal input terminals each connected to one of said base electrodes, first means for supplying a constant current to one of said emitter electrodes, second means for supplying constant current to the other of said emitter electrodes, a logic output terminal, third and fourth asymmetrically conductive paths each connecting one collector electrode to said output terminal, and means for supplying to said output terminal a constant current in a direction corresponding to the forward direction of conduction of said third and fourth asymmetrically conductive paths.

5. A logical circuit as set forth in claim 4, wherein said asymmetrically conductive paths are constituted by semiconductor diodes.

6. A logical circuit comprising: a pair of transistors each having base, emitter and collector electrodes, first and second asymmetrically conductive paths connected between said emitter electrodes, said paths being conductive in opposite directions, a pair of signal input terminals each connected to one of said base electrodes, means for supplying a constant current to one of said emitter electrodes, second means for supplying constant current to the other of said emitter electrodes, a logic output terminal, third and fourth asymmetrically conductive paths each connecting one collector electrode to said output terminal, and means for supplying to said output terminal a constant current in a direction corresponding to the forward direction of conduction of said third and fourth asymmetrically conductive paths, each of said asymmetrically conductive paths being constituted by semiconductor diodes, each means for supplying constant current comprising a resistance connected to a D.C. supply terminal and having a value which is large compared with the other impedances of the circuit.

References Cited by the Examiner

UNITED STATES PATENTS

| | | | |
|---|---|---|---|
| 2,757,280 | 7/56 | Beard | 328—93 |
| 2,896,192 | 7/59 | Husman | 330—69 |

ARTHUR GAUSS, *Primary Examiner.*

GEORGE N. WESTBY, *Examiner.*